(12) United States Patent
Romano et al.

(10) Patent No.: US 10,975,803 B2
(45) Date of Patent: Apr. 13, 2021

(54) AIRCRAFT COMPRISING A REAR FAIRING PROPULSION SYSTEM WITH INLET STATOR COMPRISING A BLOWING FUNCTION

(71) Applicants: Pascal Romano, Moissy-Cramayel (FR); Mathieu Simon Paul Gruber, Moissy-Cramayel (FR)

(72) Inventors: Pascal Romano, Moissy-Cramayel (FR); Mathieu Simon Paul Gruber, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 15/745,932

(22) PCT Filed: Jul. 21, 2016

(86) PCT No.: PCT/FR2016/051883
§ 371 (c)(1),
(2) Date: Jan. 18, 2018

(87) PCT Pub. No.: WO2017/013361
PCT Pub. Date: Jan. 26, 2017

(65) Prior Publication Data
US 2018/0230945 A1    Aug. 16, 2018

(30) Foreign Application Priority Data

Jul. 22, 2015 (FR) ...................... 15 56954

(51) Int. Cl.
*B64D 27/20* (2006.01)
*F02K 3/062* (2006.01)
(Continued)

(52) U.S. Cl.
CPC .............. *F02K 3/062* (2013.01); *B64C 21/06* (2013.01); *B64D 27/14* (2013.01); *B64D 27/20* (2013.01);
(Continued)

(58) Field of Classification Search
CPC ........ B64D 27/14; B64D 27/20; B64D 33/02; F01D 13/02; F01D 5/18; F01D 5/183;
(Continued)

(56) References Cited

U.S. PATENT DOCUMENTS 3,282,053 A * 11/1966 Messerschmitt .......... F02K 7/16
415/122.1
3,360,189 A * 12/1967 Cook ................... F04D 27/0215
415/169.1
(Continued)

FOREIGN PATENT DOCUMENTS

FR        1339141 A      10/1963
FR        1472962 A       3/1967
(Continued)

OTHER PUBLICATIONS

English translation of FR2997681A1.*
(Continued)

*Primary Examiner* — Thomas P Burke
(74) *Attorney, Agent, or Firm* — Christensen O'Connor Johnson Kindness PLLC

(57) ABSTRACT

An aircraft comprising a fuselage and a propulsion assembly, the propulsion assembly comprising at least one fan rotor located at the rear of the fuselage in the extension thereof along a longitudinal axis, and a nacelle forming a fairing of the at least one fan rotor into which a flow of air passes. The aircraft also comprises a plurality of radial stator arms mounted upstream of the at least one fan rotor and extending between the fuselage and the nacelle, the radial
(Continued)

arms comprising blowing means configured for blowing, into the environment of a trailing edge of the radial arms, an additional air flow adding to the airflow in the extension of the trailing edge.

26 Claims, 4 Drawing Sheets

(51) Int. Cl.
| | |
|---|---|
| F02K 3/072 | (2006.01) |
| F01D 9/06 | (2006.01) |
| F01D 17/16 | (2006.01) |
| F04D 29/54 | (2006.01) |
| F04D 29/68 | (2006.01) |
| B64D 27/14 | (2006.01) |
| B64C 21/06 | (2006.01) |
| F02C 7/042 | (2006.01) |

(52) U.S. Cl.
CPC .............. *F01D 9/06* (2013.01); *F01D 17/162* (2013.01); *F02C 7/042* (2013.01); *F02K 3/072* (2013.01); *F04D 29/542* (2013.01); *F04D 29/684* (2013.01); *F05D 2220/323* (2013.01); *F05D 2220/327* (2013.01); *Y02T 50/60* (2013.01)

(58) Field of Classification Search
CPC .......... F01D 5/184; F01D 5/188; F01D 5/189; F02C 7/042; F02C 7/04; F02C 9/20; F02K 3/062; F05D 2240/122
See application file for complete search history.

(56) References Cited

U.S. PATENT DOCUMENTS

| | | | | |
|---|---|---|---|---|
| 3,363,419 | A * | 1/1968 | Wilde | F02K 3/062 415/119 |
| 3,366,350 | A | 1/1968 | Hoffert et al. | |
| 3,830,431 | A * | 8/1974 | Schwartz | F02K 1/383 239/265.11 |
| 4,222,703 | A * | 9/1980 | Schaum | F01D 17/105 415/58.1 |
| 4,240,250 | A * | 12/1980 | Harris | F02C 7/045 415/119 |
| 4,254,619 | A * | 3/1981 | Giffin, III | F02K 3/075 244/55 |
| 4,280,678 | A * | 7/1981 | Roberts | F04D 27/023 251/155 |
| 4,526,512 | A * | 7/1985 | Hook | F01D 5/188 415/115 |
| 4,640,091 | A * | 2/1987 | Blizzard | F01D 17/105 60/795 |
| 4,720,235 | A * | 1/1988 | Lachance | F02C 9/18 415/58.1 |
| 4,897,020 | A * | 1/1990 | Tonks | F01D 5/186 415/115 |
| 5,076,052 | A * | 12/1991 | Wildner | F02C 7/042 60/244 |
| 5,156,353 | A | 10/1992 | Gliebe et al. | |
| 5,568,724 | A | 10/1996 | Lindner et al. | |
| 6,139,259 | A | 10/2000 | Ho et al. | |
| 6,499,285 | B1 * | 12/2002 | Snyder | B64D 33/02 244/53 B |
| 7,241,107 | B2 * | 7/2007 | Spanks, Jr. | F01D 5/186 29/889.721 |
| 7,316,539 | B2 * | 1/2008 | Campbell | F01D 5/146 244/123.1 |
| 8,870,524 | B1 | 10/2014 | Liang | |
| 10,773,813 | B2 * | 9/2020 | Bordoni | F01D 13/003 |
| 2007/0084582 | A1 * | 4/2007 | Govern | B23K 9/0026 164/137 |
| 2008/0031738 | A1 * | 2/2008 | Lee | F01D 5/18 416/97 R |
| 2009/0185903 | A1 * | 7/2009 | Beeck | F01D 5/145 416/91 |
| 2014/0093389 | A1 * | 4/2014 | Morris | F01D 5/183 416/97 R |
| 2014/0219788 | A1 * | 8/2014 | Nilsson | F01D 5/189 415/175 |
| 2015/0030432 | A1 * | 1/2015 | Smith | B23P 6/002 415/115 |
| 2015/0086352 | A1 * | 3/2015 | Eleftheriou | F02C 7/04 415/213.1 |
| 2015/0291285 | A1 | 10/2015 | Gallet | |
| 2016/0298544 | A1 * | 10/2016 | Suciu | F02C 7/06 |

FOREIGN PATENT DOCUMENTS

| | | | |
|---|---|---|---|
| FR | 2613688 | A1 | 10/1988 |
| FR | 2997681 | A1 * | 5/2014 ............ F01D 13/02 |
| RU | 2092708 | C1 | 10/1997 |
| RU | 2101535 | C1 | 1/1998 |

OTHER PUBLICATIONS

International Search Report dated Oct. 25, 2016, issued in corresponding International Application No. PCT/FR2016/051883, filed Jul. 21, 2016, 3 pages.

Written Opinion of the International Searching Authority dated Oct. 25, 2016, issued in corresponding International Application No. PCT/FR2016/051883, filed Jul. 21, 2016, 6 pages.

* cited by examiner

AIRCRAFT COMPRISING A REAR FAIRING PROPULSION SYSTEM WITH INLET STATOR COMPRISING A BLOWING FUNCTION

FIELD OF THE INVENTION AND PRIOR ART

The present invention relates to an aircraft, such as an aeroplane, particularly a civil aeroplane, propelled by one or more fans placed downstream of the fuselage and, more specifically, it relates to the case where the fans are ducted by a nacelle. The invention relates to means for distributing the air flow entering into said nacelle.

The type of turbine engine with a fan at the rear of the fuselage is found, for example, in an aircraft architecture proposed in patent applications FR-A1-2997681 and FR-A-1339141. In this case, the turbine engine is integrated in the extension of the fuselage downstream of said fuselage, with a view to reducing noise pollution and aircraft fuel consumption while limiting aerodynamic drag through absorption of the boundary layer.

In such an architecture, an aircraft is propelled by a turbine engine with ducted contra-rotating fans, the turbine engine being integrated in the rear of the fuselage of the aircraft. In general, the turbine engine comprises at least two gas generators that supply a power turbine which has two contra-rotating rotors for driving two fans arranged downstream of the gas generators. The gas generators have distinct lateral air intakes for supplying each gas generator.

The fans are arranged downstream of the gas generators in the extension of the fuselage of the aircraft and are generally supplied via an annular ring connected to said aircraft, so as to absorb at least part of the boundary layer formed around the fuselage. The diameter of the fans is approximately that of the largest portion of the fuselage. The rotation speed of the fans is generally lower than in conventional turbine engines, particularly so that the speed at the vane head can be subsonic.

The two fans form a propulsion assembly which has a low compression ratio and a high flow rate. In this case, the operation and the operability of said propulsion assembly are particularly sensitive to the conditions for introducing the air flow into the nacelle, particularly the orientation and homogeneity of said air flow.

The object of the present invention is to provide a solution for adapting at least some of the parameters of the flow entering the nacelle to the operating conditions of the propulsion assembly.

DISCLOSURE OF THE INVENTION

To this end, the invention relates to an aircraft comprising a fuselage and a propulsion assembly, said propulsion assembly comprising a power turbine, at least two distinct gas generators each arranged in a primary flow duct, at least one fan rotor placed at the rear of the fuselage, in the extension of the fuselage, along a longitudinal axis, the fan rotor being driven by the power turbine, and a nacelle forming a fairing for said at least one fan rotor through which an air flow passes, each primary flow duct converging towards a central duct that supplies the turbine engine, the aircraft further comprising a plurality of radial stator arms mounted upstream of said at least one fan rotor and extending between the fuselage and the nacelle, said radial arms comprising blowing means configured to blow, in the vicinity of a trailing edge of said radial arms, an additional air flow adding to said air flow in the extension of the trailing edge.

Blowing air into the extension of the trailing edge limits the local slowing down, or "wake", of the flow that is associated with the arm by re-energising said flow. In particular, said wake is a major source of noise when it is encountered by the vanes of the fan rotor downstream. By reducing said wake, the noise generated by the propulsion assembly of the aircraft is thus reduced.

Advantageously, the blowing means are arranged to differentially distribute the flow of the additional air flow along the span of a radial arm, preferably by providing a greater flow in a part that is close to the external radial end than in a part that is close to the internal radial end.

This allows the blowing to be adapted to the local flow conditions in order to minimise the wake, particularly by taking into account the fact that the speed of the flow is greater remote from the fuselage. To this end, the aircraft comprises means for differentially adjusting the flow rate of said additional flow on at least two radial portions of the radial arms.

Advantageously, the blowing means are arranged to vary the flow of the additional air flow over time depending on the operating conditions of the propulsion assembly. This allows, for example, losses to be minimised in the engines at low speed when the additional air flow is captured from the compressor stage of the gas generators.

According to a preferred embodiment, each radial arm comprising two lateral faces extending radially either side of a mean profile, the blowing means comprise orifices arranged on said lateral faces to blow the additional air flow upstream of the trailing edge.

Two grids placed at the output of said orifices, one sliding relative to the other, can form adjusting means for adjusting the additional air flow.

Preferably, each of said orifices has an extension along the longitudinal axis that is between 5% and 10% of the chord length of the radial arm, in relation to the radial distance at which said orifice is located.

This allows an additional air flow to be introduced with a flow rate that is adapted to counteract the speed deficit in the wake by minimising any disruptions resulting from the blowing.

In an alternative embodiment, the blowing means comprise devices for blowing the additional air flow from the trailing edge.

Preferably, the plurality of radial arms comprises at least a plurality of retention arms configured to retain the nacelle.

The use of a plurality of retention arms upstream allows the homogeneity and the symmetry of the absorption of the forces supported by the nacelle to be enhanced. The rigidity of said nacelle can then be reduced, which helps to reduce the mass of the assembly.

Advantageously, the distance separating the trailing edge of said radial arms and the fan rotor located immediately downstream along said flow, measured at a radial distance substantially corresponding to 70% of the span of a vane of said fan rotor, is at least substantially equal to three twentieths of the external diameter of said fan rotor.

In particular, in the case of the retention arms of the nacelle, this allows the flow to be homogenised and the mixture between the additional blown air and the main flow to be mixed in order to minimise the wake effects.

Advantageously, the plurality of radial arms comprises at least a plurality of arms comprising a variable-pitch movable part configured to axially deflect said air flow.

Deflecting the air flow entering the fan rotor allows any circumferential inhomogeneities or distortions of said air flow, which are particularly created as it travels along the fuselage of the aircraft, to be corrected.

Advantageously, the blow orifices are located upstream of said movable parts.

Advantageously, the additional air flow is continuously pulsed or blown.

Advantageously, such an aircraft comprises a turbine engine comprising at least one gas generator configured to generate a primary flow, which is delivered via a central duct to at least one power turbine, said power turbine being placed at the rear of the fuselage, in the extension of the fuselage, and driving said at least one fan rotor on the periphery of said power turbine.

Advantageously, the central duct is arranged upstream of the power turbine.

Advantageously, the central duct is arranged upstream of the fan.

Advantageously, the power turbine is installed at the rear of the fuselage, in the extension of the fuselage.

Advantageously, the propulsion assembly is arranged at the rear of the fuselage.

Advantageously, the blowing means are arranged upstream of the fan rotor.

BRIEF DESCRIPTION OF THE DRAWINGS

The present invention will be better understood, and further details, features and advantages of the present invention will become more clearly apparent, upon reading the following description of a non-limiting example, with reference to the accompanying drawings, in which.

DESCRIPTION OF AN EMBODIMENT

The Aircraft and the Turbine Engine

Figure 1:
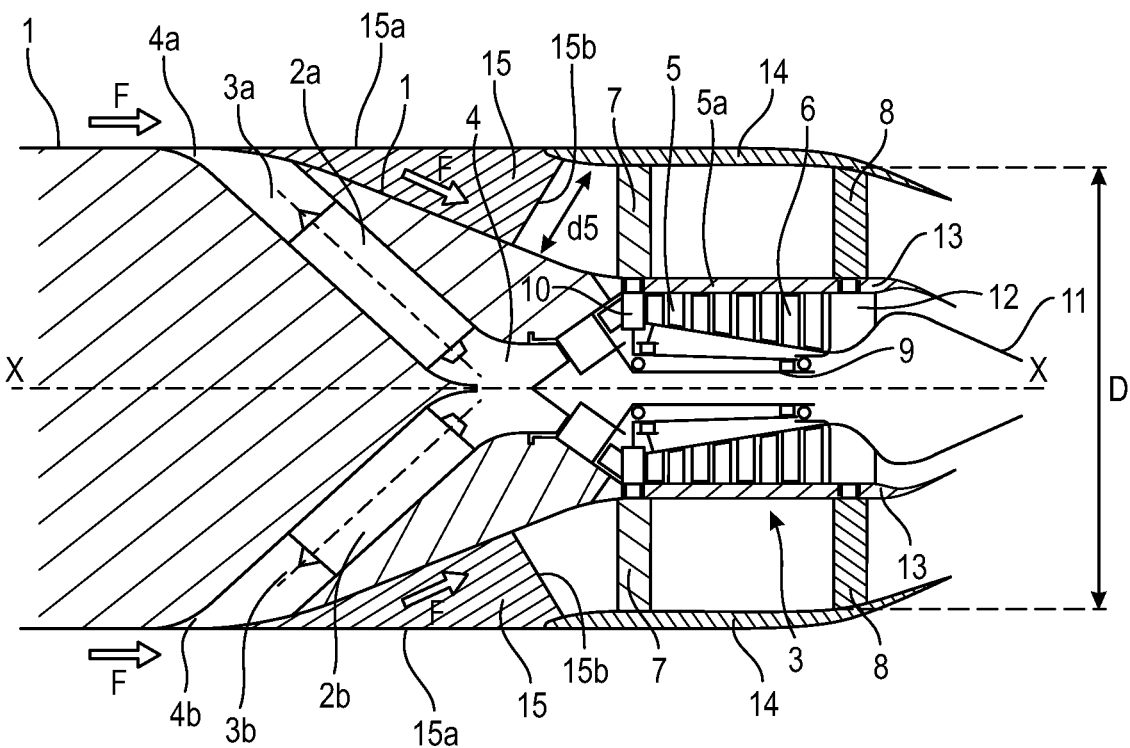
FIG. 1 is a schematic longitudinal section of the rear part of an aircraft according to the invention, and the propulsion assembly thereof.
Figure 2:
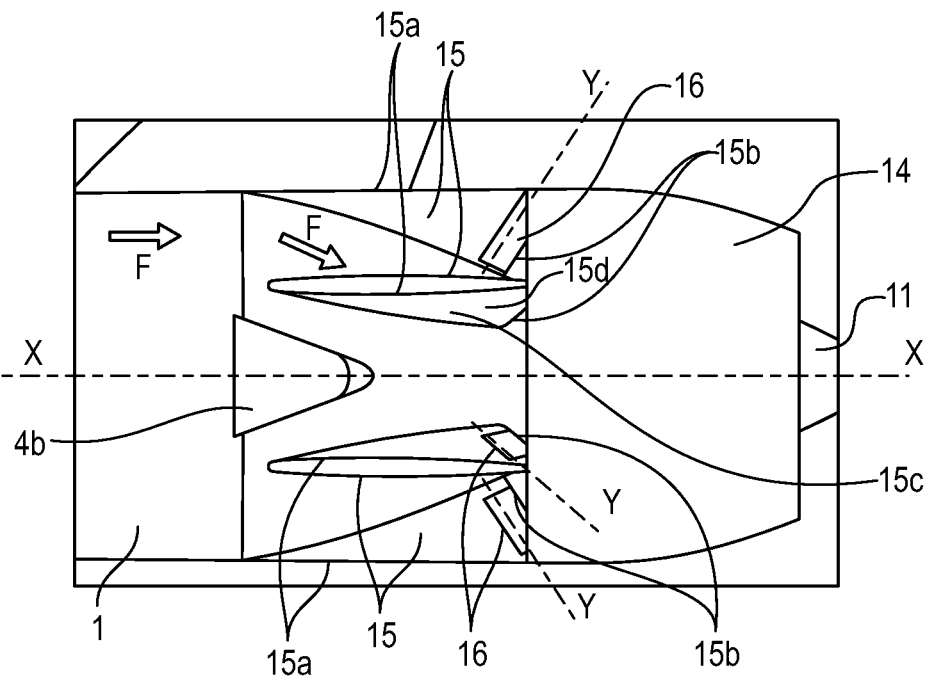
FIG. 2 is a schematic side view of the rear part of an aircraft according to the invention, and the propulsion assembly thereof.

The invention is particularly applicable to an aircraft, such as an aeroplane, comprising a turbine engine of the type shown in FIG. 1 or FIG. 2.

As shown in FIG. 1, the turbine engine is centred on the longitudinal axis XX of the fuselage 1 of the aircraft. Said turbine engine comprises, in the upstream to downstream direction, in the direction of flow of the gases, two distinct gas generators 2a, 2b simultaneously supplying a single power turbine 3. The turbine engine is installed at the downstream end of the fuselage 1 of the aircraft.

Throughout this document, the terms axial and radial refer to the axis XX of the fuselage and of the turbine engine. Similarly, the terms upstream and downstream refer to the direction of the main flow along said axis.

In a manner known per se, each gas generator 2a, 2b comprises at least one compressor, one combustion chamber and at least one high-pressure turbine (not shown in the Fig.).

Each gas generator 2a, 2b is housed inside a primary flow duct 3a, 3b. Distinct air intakes 4a, 4b are provided for these ducts 3a, 3b in order to supply each gas generator 2a, 2b.

In the configuration shown in FIG. 1, said air intakes 4a, 4b are connected to the fuselage 1 of the aircraft, upstream of the gas generators 2a, 2b, so as to absorb at least part of the boundary layer formed around the fuselage 1 of the aircraft. More specifically, the internal wall of said air intakes is directly integrated in the fuselage 1 of the aircraft.

In other configurations, not shown herein, the air intakes 4a, 4b can be spaced apart from the fuselage 1 in order to supply the compressors of the gas generators 2a, 2b with a flow that is less disrupted by the boundary layer on the fuselage 1. It is also conceivable for more than two gas generators to be used, for example three, to supply the power turbine 3.

In any case, the air intakes 4a, 4b are designed to limit the disruptions that they can create downstream on the flow F following the fuselage 1 and entering a propulsion assembly that is described hereafter. Furthermore, in this case said air intakes are located at the beginning of the portion of the fuselage 1 that proceeds, while narrowing, towards said propulsion assembly, so as to separate said air intakes therefrom.

Preferably, the two primary flow ducts 3a, 3b of the gas generators 2a, 2b converge on the longitudinal axis XX and together form an open V in the upstream direction, the angle of opening of which V is preferably between 80° and 120°.

The two primary flow ducts 3a, 3b of the gas generators 2a, 2b converge in a central primary duct 4 that supplies the power turbine 3. A mixer (not shown in the Fig.) is preferably positioned at the convergence zone of the two ducts 3a, 3b which house the gas generators 2a, 2b. The purpose of this mixer is to mix the gaseous flows from the two gas generators 2a, 2b in order to form a single homogenous gaseous flow at the output of the central primary duct 4.

The power turbine 3, which is supplied by said primary flow at the output of the central duct 4, is placed in the extension of the fuselage 1. Said power turbine 3 drives at least one fan rotor. In this case, the power turbine is provided with two contra-rotating turbine rotors 5, 6 for contra-rotating two fan rotors 7, 8. Said turbine rotors 5, 6 are coaxial and are centred on the longitudinal axis XX. They rotate about an internal casing 9 which is fixed to the structure of the aircraft.

In this case, a first turbine rotor 5 corresponds to vanes connected to a tubular body 5a separating the primary flow duct, in the power turbine 3, from the secondary flow duct, in which the fan rotors 7, 8 are located. The vanes and the tubular body 5a of the first rotor 5 are connected to the support bearings of the rotor 5 on the internal casing 9 by support arms 10, which pass through the primary duct upstream of the power turbine 3.

In the same example, the second rotor 6 corresponds to vanes that are connected to a radially internal wall of the primary duct in the turbine 3 and are longitudinally interposed between the vanes of the first rotor 5.

Downstream of the power turbine 3, the radially internal part of the second rotor 6 extends by a central body 11. Moreover, it is connected, by support arms 12, to a ring 13 for supporting the vanes of the downstream fan rotor 8. Furthermore, said ring 13 extends the tubular body 5a of the first rotor 5 and comprises a rearwards extension, so as to form, together with the central body 11, a primary ejection pipe at the output of the power turbine 3.

In the example shown, the propulsion assembly is formed by two fan rotors 7, 8 ducted by a nacelle 14 fixed to the structure of the aircraft. The fan rotors have an external diameter D that is close to the greatest external diameter of the fuselage 1 of the aircraft.

In this case, a first upstream fan rotor 7 is positioned at the intake of the power turbine 3. It is connected to the first rotor 5 of the turbine 3 at the arms 10, which support the external cylindrical body 5a upstream. Said upstream fan rotor 7 thus rotates at the same speed as the first rotor 5 of the power turbine 3.

In the same example, the second downstream fan rotor 8 is positioned at the output of the power turbine 3. It is connected to the second rotor 6 of the turbine 3 at the support ring 13 and its supporting arms 12. This downstream fan rotor 8 thus rotates at the same speed as the second rotor 6 of the power turbine 3.

As the air entering the fans 7, 8 is partly made up of the boundary layer of the fuselage of the aircraft, the intake speed is low compared to conventional turbine engine fans and the output speed is also lower at an identical compression ratio, which improves the propulsive and acoustic performance of said fans. Furthermore, the significant external diameter D of the fans 7, 8 means that their rotation speed, like that of the rotors 5, 6 of the power turbine 3, will also remain low compared to a conventional turbine engine.

Furthermore, in a variant of an embodiment, not described, the power turbine 3 can be formed in a known manner by a single rotor and a stator, the propulsion assembly only having one fan associated with said rotor.

Retention of the Nacelle

With reference to FIG. 2, the nacelle 14 can be retained by a plurality of circumferentially distributed retention arms 15, typically between three and six arms, connecting it upstream of the first fan rotor 7 to a fixed structure of the aircraft 1. The retention arm extends the nacelle 14 from the fans as far as the fuselage. Increasing the number of retention arms 15 allows the homogeneity and the symmetry of the absorption of the forces borne by the nacelle 14 to be enhanced. The rigidity of the nacelle can then be reduced, which helps to reduce the mass of the assembly.

However, the aim is to reduce the disruptions, as well as the drag, of the retention arms 15 on the flow F entering the nacelle 14. Said retention arms 15 thus comprise a profiled fairing forming a radial vane that extends from the fuselage 1 of the aircraft to the nacelle 14. In the example shown in FIG. 2, said vane has a substantially trapezoidal shape between a lower elongated base, at its intersection with the fuselage 1, and a short external base, at its intersection with the nacelle 14. Upstream, in the direction of the flow F entering the nacelle 14, said vane has a leading edge 15a, which connects the fuselage 1 and the nacelle 14 in a direction substantially in parallel with the axis XX. Downstream, the trailing edge 15b of said vane, which is substantially transverse to the flow F entering the nacelle 14, travels in a direction that forms an angle close to a right angle with the fuselage 1.

Arm with Movable Flap

Figure 3:
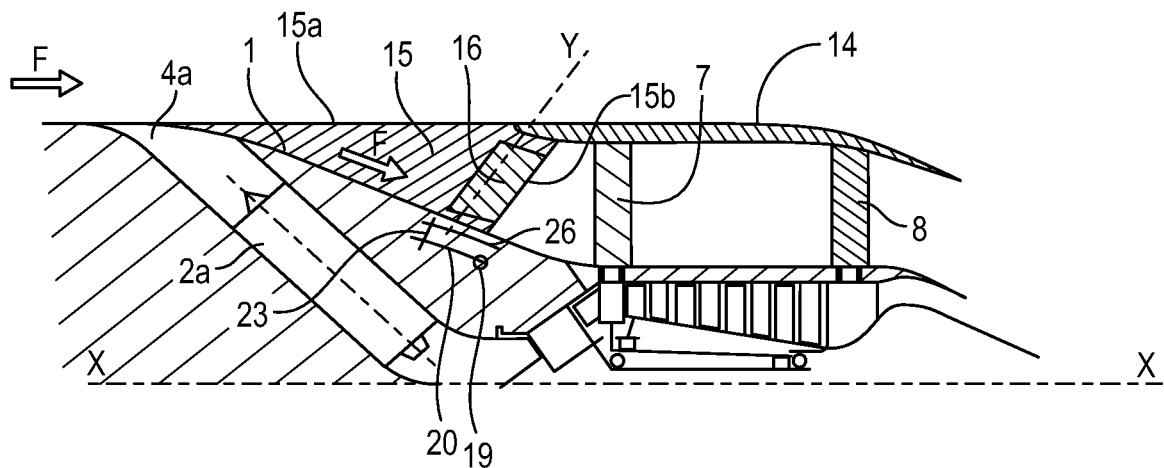
FIG. 3 is a schematic view of the rear part of an aircraft according to the invention and the propulsion assembly thereof in longitudinal section in a plane passing through a retention arm equipped with a movable flap.

With reference to FIGS. 2 and 3, according to a first aspect of the invention, the retention arms 15 of the nacelle 14 can be provided with flaps 16 on their trailing edge 15b. Each of said flaps can rotate freely about an axis Y, which is substantially radial and in parallel with the trailing edge 15b and substantially extends on the span of the retention arm 15. The flaps are arranged at the inlet of the nacelle, as can be seen in FIG. 3.

The flow F supplying the fan rotors 7, 8 is deflected upstream, following the fuselage 1, by the variations in the shape of the fuselage, as well as by elements that are not shown, for example, the wings, connected to said fuselage. Making a trailing edge flap 16 movable allows said flow F to be oriented in front of the fan rotor 7, and the incidence perceived by the fan rotor and the related distortion to be minimised. Given that the two fan rotors 7, 8 form a propulsion assembly having a low compression ratio and a high flow rate, minimising distortions of the air flow entering the nacelle 14 can significantly improve the operation and the operability of said propulsion assembly.

As shown in FIG. 3, these movable flaps 16 extend over most of the span of the retention arm 15, so as to orient all the flow entering the nacelle 14. In FIG. 3, the movable flap 16 has a chord that is substantially constant depending on the span, but this is by no means limiting. The chord of the movable flap can, for example, increase from the fuselage 1 towards the nacelle 14, if it is beneficial to more significantly modify the flow F towards the radial end of the vanes of the upstream fan rotor 7.

The pitch angle of the movable flaps 16 can be adjusted collectively, using the same value for all the retention arms 15, or individually, by adapting the value according to the azimuthal position of each retention arm 15. This second option allows conditions for supplying the propulsion assembly with a non-symmetrical flow F to be dealt with, in the case of a crosswind, for example.

The adjustment of the pitch angle of the movable flaps 16 can also vary temporally and can be controlled by the variations in the conditions for supplying the propulsion assembly. In the case of a crosswind, for example, this allows the variation in intensity or direction thereof to be taken into account.

Movable Radial Vane

Figure 4:
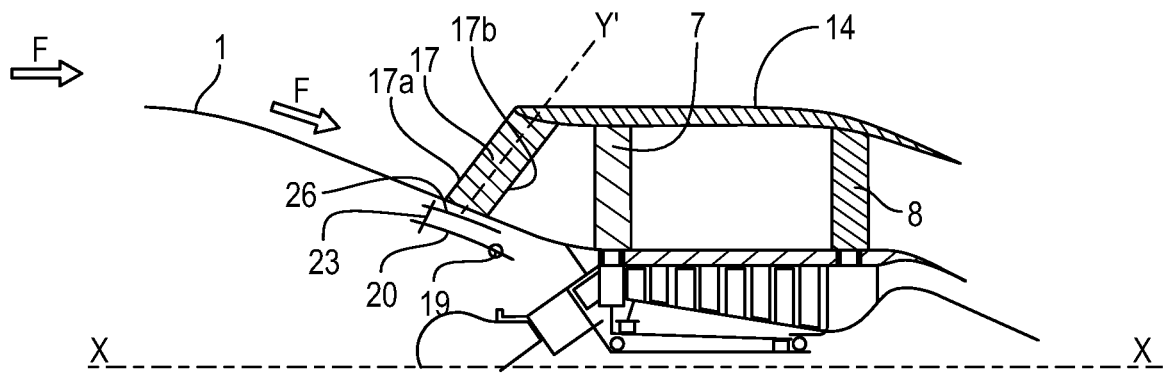
FIG. 4 is a schematic view of the rear part of an aircraft according to the invention and the propulsion assembly thereof in longitudinal section in a plane passing through a movable radial vane.

In one variant of an embodiment, shown in FIG. 4, variable-pitch radial stator vanes 17, which connect the fuselage 1 to the nacelle 14, can be arranged azimuthally between the retention arms 15, preferably at the same axial level as the movable flaps 16 of said arms. Said vanes each can rotate freely about an axis Y' at an incline, relative to the axis XX, that is substantially equal to that of the axes of rotation Y of the movable flaps 16 of the retention arms 15. The vanes are disposed at the inlet of the nacelle 14.

In this case, the radial stator vanes 17 do not have a structural function for retaining the nacelle 14. In this example, each radial stator vane 17 has an elongate shape, which is preferably three-dimensional, extending in a radial direction. Each radial stator vane 17 preferably has a chord that is substantially constant over its length and substantially equal to the chord of the movable flaps 16 on the retention arms 15. Preferably, each radial stator vane 17 forms an aerodynamic body having a leading edge 17a and a trailing edge 17b, in order to deflect any incident air flow F received by the radial stator vane 17.

In this case, the pitch of the radial vanes 17 is adjustable and is optionally individually or collectively controlled, according to the same conditions as those described for the movable flaps 16 of the retention arms 15. The assembly of the radial vanes 17 and the movable flaps 16 thus forms a ring of variable-pitch radial stator arms at the inlet of the nacelle 14.

In the example shown, which has the contra-rotating fan rotors 7, 8, increasing the number of variable-pitch profiles allows the inhomogeneities of the flow F entering the nacelle 14 to be more precisely corrected, the number of retention arms 15 being limited. The values of the pitch angles of the movable flaps 16 and of the radial vanes 17 preferably changes within a low range of values, which is typically less than 15° in absolute terms.

Single Fan

In the case, not shown, where the propulsion assembly comprises a single fan rotor in the nacelle 14, the assembly of variable-pitch radial arms formed by the movable flaps 16 and the variable-pitch radial vanes 17 can act as an inlet guide wheel. Indeed, the plurality of movable flaps 16 and of variable-pitch stator vanes 17 mounted upstream of the fan rotor allows the incident air flow F to be deflected such that the deflected air flow F comprises an axial and tangential component. Subsequently, the deflected air flow F is axially rectified by the vanes of the fan rotor and is compressed such that the air flow exiting the nacelle 14 advantageously only comprises one predominant axial component.

Preferably, such a rectifier assembly comprises at least twenty variable-pitch radial vane 17 and movable flap 16 profiles. Furthermore, in order to obtain a rectifying effect, the pitch of the radial vanes 17 and of the movable flaps 16 depends on the fan rotor, but must be at least 15°, whilst normally remaining below 65°.

Similarly, if an aerodynamic criterion, known as "spacing", is considered, which criterion is defined by the ratio of the chord length of the movable flaps 16 or of the radial vanes 17 to the distance between two movable flaps 16 or radial vanes 17 which are adjacent at the head, the value of the "spacing" is greater than 0.8, so as to obtain a rectifying effect. By comparison, for the retention arms 15, a "spacing" value below 0.5 would be sought in order to minimise the disruptions of said retention arms on the incident flow F.

Supplement on Pitch Adjustment Systems

A plurality of devices can be installed to produce an adaptive and individual pitch for the movable flaps 16 and/or for the radial vanes 17 about their respective axes of rotation Y, Y'. An embodiment of means for individually adjusting the pitch of the movable flaps 16 and/or of the radial vanes 17 is provided herein by way of an illustrative and non-limiting example.

In this example, with reference to FIGS. 3 and 4, the adjusting means for individually adjusting the variable pitch are preferably located on a fixed structure, not shown, inside the fuselage 1.

Figure 5:
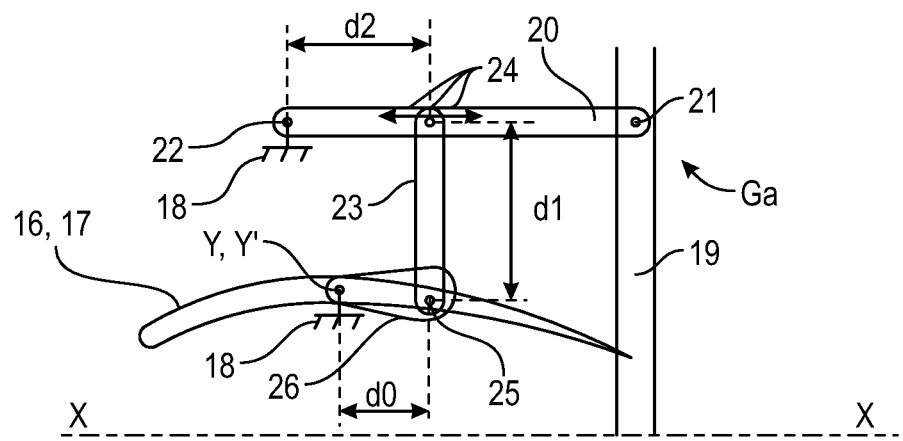
FIG. 5 is a schematic view of the device for adjusting the pitch of a movable arm flap or of a radial stator vane applicable to the invention.

In this example, with reference to FIG. 5, each movable flap 16 and/or radial vane 17 is mounted so as to be rotatable about its axis of rotation, also referred to as pitch axis Y, Y', said pitch axis Y, Y' being fixed on a pivot means rigidly connected to a fixed structure 18 of the aircraft. Furthermore, a control ring 19 is mounted so as to be rotatable about the longitudinal axis X-X relative to the fixed structure 18 of the aircraft.

A first connecting rod 20 is mounted, at one of its ends, so as to be rotatable about a first pivot shaft 21, which is substantially radial and is rigidly connected to the control ring 19, and is mounted, at its other end, so as to be rotatable about a second pivot shaft 22, which is substantially radial and is mounted on the fixed structure 18 of the aircraft.

The first pivot shaft 21 can be, for example, a pin inserted into a longitudinal slot at the end of the connecting rod 20. In this way, when the control ring 19 rotates, the movement of the pin can set the connecting rod 20 into rotation about the second pivot shaft 22.

The second pivot shaft 22 of the first connecting rod 20 is azimuthally offset relative to the pitch axis Y, Y' of the movable flap 16 or of the radial vane 17 and, in this case, upstream of said pitch axis Y, Y'.

In this case, the first connecting rod 20 is substantially aligned with the longitudinal axis X-X, thus substantially perpendicular to the control ring 19 for a position Ga thereof that corresponds to an average pitch of the movable flap 16 or of the radial vane 17.

A second connecting rod 23 is pivotally mounted on the first connecting rod 20 about an articulation shaft 24 between the two connecting rods, close to one of its ends. Means supporting said articulation shaft 24 can be configured so that the articulation shaft 24 can be moved on the first connecting rod 20.

The second connecting rod 23 is pivotally articulated, in the vicinity of its other end, about a third pivot shaft 25 mounted on the movable flap 16 or the radial vane 17. The third pivot shaft 25 is placed at a non-zero distance d0 from the pitch axis Y, Y' of the movable flap 16 or of the radial vane 17, so as to provide a lever arm that allows the displacement of the second connecting rod 23 to be converted into a rotation movement of the movable flap 16 or of the radial vane 17, and thus into a modification of its pitch angle. This offset can be provided by a connecting rod 26 that is fixed relative to the movable flap 16 or to the radial vane 17, or by any other means. In this case, the third pivot shaft 25 is substantially located on the chord of the movable flap 16 or of the radial vane 17, this example being by no means limiting. In the example shown, the third pivot shaft 25 is located downstream of the pitch axis Y, Y' of the movable flap 16 or of the radial vane 17.

Furthermore, the second connecting rod 23 in this case is mounted so that it is substantially perpendicular to the first connecting rod 25 for a control ring 24 position that corresponds to an average pitch of the movable flap 16 and/or of the radial vane 17.

With such an assembly, a command variable Ga is available for varying the pitch angle of each movable flap 16 or radial vane 17, which command variable corresponds to the position of the control ring 19 when said control ring rotates about the axis XX, and two adjustable parameters are available for modifying the influence of the command variable Ga according to the azimuthal position of the movable flap 16 and/or of the radial vane 17.

A first parameter corresponds to the distance d1, on the second connecting rod 23, between the third pivot shaft 25 and the articulation shaft 24 connected to the first connecting rod 20. Said distance d1 has an immediate influence, as can be seen from FIG. 5, on the pitch angle of the movable flap 16 and/or of the radial vane 17 for a given position Ga of the control ring 19. Said distance d1 can be modified, for example, by changing the second connecting rod 23.

The second parameter relates to the distance d2, on the first connecting rod 20, between the second pivot shaft 22 and the articulation shaft 24 connected to the second connecting rod 23. Said second parameter d2 is more specifically associated with a multiplication factor of the amplitude of the variations of the pitch angle of the movable flap 16 or of the radial vane 17 relative to the position variations Ga of the control ring 19. Reducing the distance d2 causes a reduction in the amplitudes of the pitch angle for the same displacement Ga of the control ring 19, and vice versa.

Such a device can be used to correct any inhomogeneities in the boundary layer ingested by the fan rotors 7, 8. A lower distortion level is observed due to the low speed ingestion of the boundary layer (landing or take-off) and, by contrast, high distortion is observed in cruise flight. The pitch of the movable flaps 16 and/or of the radial vanes 17 can thus be adjusted:

by associating a first value of the command position Ga with low speed flight, for which no azimuthal variation in the pitch of the vanes is required; and by associating a second value of the command position Ga with cruise flight, for which an azimuthal variation of the pitch of the vanes is implemented to correct the distortion.

Structural Arms Comprising Blowing

Figure 6:
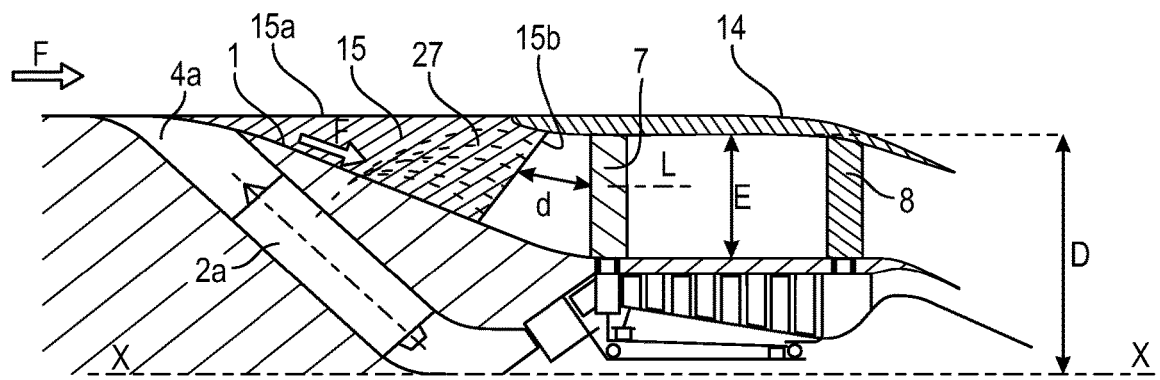
FIG. 6 is a schematic view of the rear part of an aircraft according to the invention and the propulsion assembly thereof, in longitudinal section in a plane passing through a retention arm equipped with a blowing device.

According to another aspect of the invention, with reference to FIG. 6, the retention arms 15 can be provided with devices for blowing additional air Fs in the vicinity of their trailing edge 15b. Advantageously, in this case, said air is taken from the compressors of the one or more gas generators 2a and is routed towards the blowing devices via conduits 27 passing inside the retention arm 15.

Blowing additional air Fs allows the speed deficit due to the boundary layer that forms along the fairing of the arm, in the flow F entering the nacelle 14, to be counteracted, ideally completely. It suppresses or significantly attenuates the wake that forms behind the retention arm 15.

However, the interaction of said wake with the vanes of the fan rotors 7, 8 that rotate behind is a major source of noise. Typically, the noise created by these interactions can be divided into a tonal component and a wideband component.

The tonal component corresponds to the interaction between the mean wake and, mainly, the first fan rotor 7. This component is expressed at the natural frequencies of the upstream fan rotor 7. A significant increase in the noise levels is observed on the fundamental moving frequency of the rotor vanes 7 and on its harmonics.

The wideband component mainly corresponds to the interaction between the turbulent structures contained in the wake of the retention arm 15 and the leading edge of the vanes of the fan rotor 7.

Aeronautical standards particularly seek to reduce the value of said noise in the far field in order to limit noise disturbances and issue restrictions with respect to the value of said noise while measuring an environmental impact. The assessment of the perceived noise corresponds to a weighting of the intensity relative to the frequencies and is measured according to a unit known as EPNdB (effective perceived noise decibels). By way of an example, it has been seen that a fixed arm placed in front of a pair of unducted, contra-rotating helices can result in a penalty of approximately 6 EPNdB on the noise emitted by an aircraft. However, it has been estimated that this noise impact can be partly reduced to 3 EPNdB with air blowing on the trailing edge of the arm.

Figure 7A:
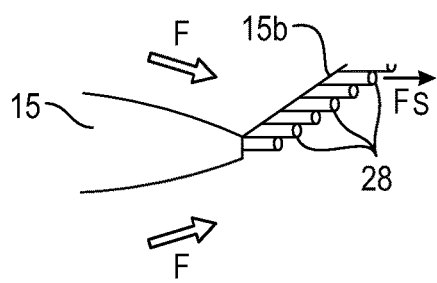
FIG. 7a is a schematic perspective view of a portion of the trailing edge of a nacelle retention arm according to the invention equipped with a first variant of blowing means.

In a first embodiment of the blowing devices, with reference to FIG. 7a, the trailing edge 15b of the retention arm 15 is truncated and leaves room for nozzles 28 for blowing additional air Fs, which nozzles are distributed on the span of the retention arm 15. Said nozzles are supplied by the previously described conduits 27. The spacing of the nozzles 28, their diameter and their shape are arranged, in relation to the air flow carried by the conduits 27, to create jets that drive the flow so as to counteract the speed deficit behind the trailing edge 15b and to thus minimise the wake of the arm. Advantageously, said nozzles 28 are retractable in the absence of blowing.

Figure 7B:
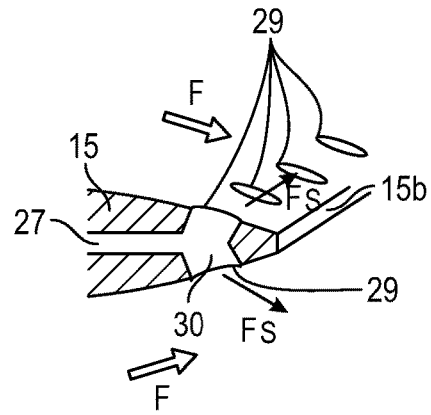
FIG. 7b is a schematic perspective sectional view of a portion of the trailing edge of a nacelle retention arm according to the invention equipped with a second variant of blowing means.

In a second embodiment, with reference to FIG. 7b, ejection orifices 29 for blowing additional air Fs are distributed, in this case on each face of the profile of the retention arm 15, upstream of the trailing edge 15b. Said ejection orifices 29 can be in the shape of ovoid holes or of slots extending substantially in parallel with the trailing edge 15b. The air supply conduits 27 emerge in an internal cavity 30 that communicates with the ejection orifices 29. In this device, the blowing of additional air Fs exiting through the ejection orifices 29 is quickly drawn along the wall of the retention arm 15 and the injected air flow allows the speed deficit behind the trailing edge 15b to be counterbalanced. The shapes of the internal cavity 30 and of the ejection orifices 29 are arranged to optimise this effect.

In this design, the extension of the blow orifices 29 along the chord of the profile of the retention arm 15 is preferably of the order of magnitude of the thickness of the boundary layer that develops in the flow F around said profile. Typically, for a chord length of 1 m on the retention arm 15 of the nacelle 14 and a turbulent boundary layer, the extension of the blow orifices 29 along the chord is approximately 5 to 10 cm. The extension along the longitudinal axis XX of the blow orifices 29 located at a given radial distance from said axis XX is therefore preferably between 5% and 10% of the chord length of the retention arm 15 in relation to said radial distance.

Furthermore, the trailing edge 15b of the retention arms 15 is preferably located far enough away from the upstream fan rotor 7 for the blow jet to mix with the main flow F bypassing the retention arm 15 and to attenuate the wake effect. In this case, said spacing is measured by a distance d that is measured between the trailing edge 15b and the upstream fan rotor 7 following a stream line L exceeding a certain percentage of the span of the vanes of the upstream fan rotor 7. Typically, this distance d is approximately 15% of the diameter D of the upstream fan rotor 7 at 70% of the span E of the vanes of said fan rotor.

Advantageously, the assembly further comprises means that allow the blown flow to be varied according to the position on the span E and/or to be controlled over time.

According to a first variant, one or more valves, not shown, can be placed on the conduits 27 supplying the nozzles 28 or the ejection orifices 29. The opening of each valve can be controlled in order to control the air flow passing through the one or more conduits 27 to which it is connected. The air flow Fs blown by the corresponding nozzles 28 or ejection orifices 29 is thus adjusted individually or as a group according to the positions of said nozzles or orifices on the span of the retention arm 15.

Figure 8A:
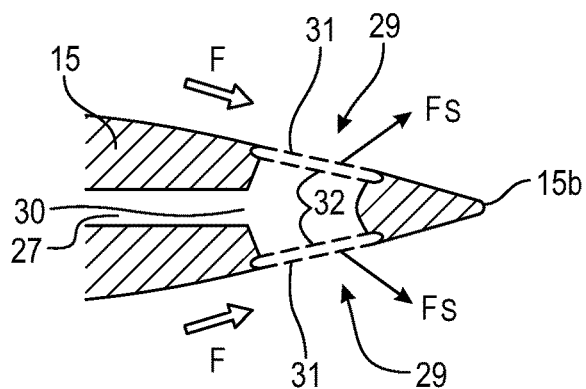
FIG. 8a is a schematic sectional view, close to the trailing edge of a nacelle retention arm according to the invention, placed in a first position and equipped with a third variant of blowing means.
Figure 8B:
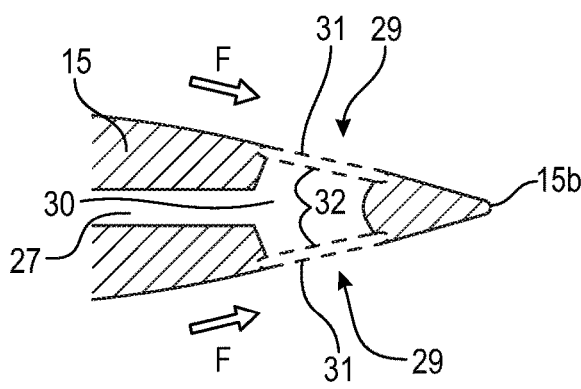
FIG. 8b is a schematic sectional view, close to the trailing edge of a nacelle retention arm according to the invention, placed in a second position and equipped with a third variant of blowing means.

With reference to FIG. 8a, 8b, a second variant is preferably applicable to the case where the ejection orifices 29 form slots in parallel with the trailing edge 15b, irrespective of whether this is continuous or discontinuous. In this variant, an ejection slot 29 is covered by a first fixed grid 31 and by a second grid 32 movable in translation along the surface of the profile of the retention arm 15. The two grids 31, 32 advantageously have a substantially identical geometry, particularly with respect to the geometry of their orifices and the bars that separate them. In this case, the first grid 31 is external and the second grid 32 slides under the first grid. The position of the second grid 32 is controlled by an actuator, which is not shown in the Fig.

In a first position of the second grid 32, with reference to FIG. 8a, the orifices of the two grids 31, 32 are superposed. The ejection slot 29 thus allows through a maximum blowing flow Fs that is compatible with the supply conditions from the conduit 27.

In a second position of the second grid 32, with reference to FIG. 8b, the orifices of each grid 31, 32 are located opposite the bars of the other grid. Advantageously, this superposition fully closes the passage, through the ejection slot 29, of the air flow coming from the supply conduit 27.

By controlling the translation movement of the grid 32 between the first and the second position, it is thus possible to vary, in a substantially continuous manner, the flow Fs of air blown through the ejection slot 29 between a minimum value and a maximum value.

In a particular embodiment, the grids 32, 31, and optionally the slots 29, can be separated into a plurality of parts along the span of the trailing edge 15b, and the translation movement of the movable grids 32 can be differentially controlled. It is thus possible to modulate by time and by space the flow blown on the trailing edge 15b.

The modulation of the flow Fs of air blown along the span mainly allows air to be blown on the radially external side of the trailing edge 15b, where the flow is fastest.

Modulating the flow Fs of blown air over time enables adaptation to the flight conditions and, if necessary, allows engine losses to be minimised by reducing the flow Fs of blown air.

Blowing/Rectifier Coupling

Advantageously, the previously described blowing means can be installed in combination with the movable flaps 16 on the retention arms 15.

Figure 9A:
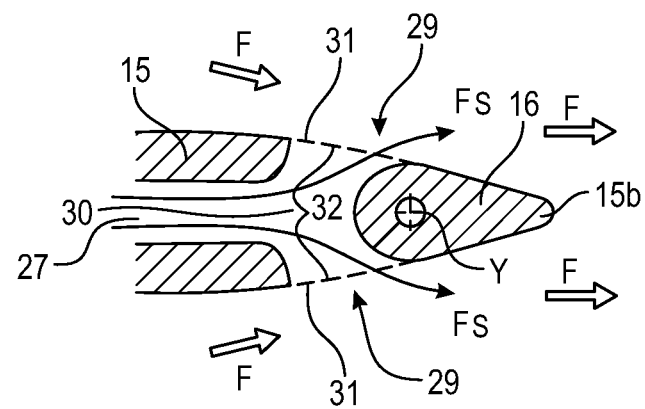
FIGS. 9a and 9b show a schematic sectional view close to the trailing edge of a nacelle retention arm according to the invention equipped with a third variant of blowing means, corresponding to FIG. 8a or 8b, associated with a movable flap with and without incidence.
Figure 9B:
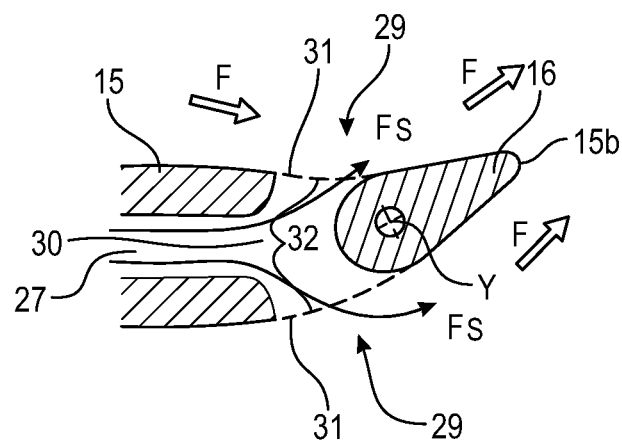

With reference to FIG. 9a, 9b, the ejection openings 29 are placed in front of the movable flap 16. In this case, the movable flap 16 closes, in the downstream direction, the cavity 30 supplying the ejection orifices 29, which are in the shape of slots. The trailing edge of the movable flap 16 is also the trailing edge 15b of the retention arm 15.

In the example shown, the systems of slots 31, 32, which are offset in order to modulate the flow Fs of air blown by the slot 29, are installed in accordance with the description provided with reference to FIG. 8a, 8b.

With reference to FIG. 9a, when the movable flap 16 is aligned in the general axis of the profile of the retention arm 15, the device for blowing additional air Fs operates in a manner similar to that described with reference to FIG. 8a, in order to limit the wake of the retention arm 15 in its extension.

With reference to FIG. 9b, when the movable flap 16 is rotated by a given pitch angle, it deflects the general flow F, and thus its wake, by an angle that is substantially equal to its pitch angle. The air Fs blown by the slots 29 either side of the retention arm 15, upstream of the movable flap 16, always exits with the same incidence as said slots 29. However, the effects of pressure on the pressure face of the movable flap 16 and of suction on the suction face carries the flow Fs of blown air into the main flow F, according to the orientation of the pitch of the movable flap 16. The blowing effected through the slots 29 thus still fulfils its function of limiting the speed deficit in the wake of the retention arm 15.

Furthermore, when variable-pitch radial vanes 17 are circumferentially disposed between the retention arms 15, as shown with reference to FIG. 4, they can also be equipped with blowing means. In this case, it can be advantageous for devices to be installed, such as those described for the retention arms 15 without a movable flap 16, with respect to the configurations of FIG. 7b or 8a and 8b. Blown air supply conduits 27 can be placed in the vicinity of the pitch axis Y'. In this case, it is to be noted that the low chord of the variable-pitch radial vanes 17 reduces their wake effect relative to the retention arms 15 and thus makes the design of the blowing devices less restrictive.

The invention claimed is:

1. An apparatus comprising:
   a fuselage having a rear,
   a propulsion assembly, said propulsion assembly comprising a power turbine, at least two distinct gas generators each arranged in a respective primary flow duct, at least one fan rotor placed at the rear of the fuselage, in an extension of the fuselage, along a longitudinal axis, the at least one fan rotor being driven by the power turbine, and a nacelle forming a fairing for said at least one fan rotor through which an air flow passes, the nacelle being centered on the longitudinal axis, wherein each primary flow duct converges towards a central duct that supplies the power turbine; and
   a plurality of radial stator arms mounted upstream of said at least one fan rotor and extending between the fuselage and the nacelle, said radial stator arm of said plurality of radial stator arms extending from the fuselage to the nacelle, each said radial stator arm having a substantially trapezoidal shape, in an axial plane containing the longitudinal axis, with a foot positioned at an intersection with the fuselage, a head positioned at an intersection with the nacelle, a leading edge which connects the fuselage and the nacelle, and a trailing edge, a radial distance between the foot and the head of the radial stator arms at the leading edge is equal to or less than a length of the trailing edge, the leading edge of each radial stator arm extending in a direction substantially parallel with the longitudinal axis,
   wherein the nacelle is annular and comprises an upstream edge, a radially inner surface and a radially outer surface, the leading edge of each radial stator arm having a surface continuity with an outer surface of the fuselage and the radially outer surface of the nacelle,
   wherein the leading edge of each radial stator arm is linked to said upstream edge and to the fuselage such that each radial stator arm extends upstream of a forward-most portion of the nacelle,
   each radial stator arm of said plurality of radial stator arms comprising blowers configured to blow, in a vicinity of the trailing edge of said respective radial stator arm of said plurality of radial stator arms, an additional air flow adding to said air flow in an extension of the trailing edge,
   wherein each radial stator arm of said plurality of radial arms comprises at least one air supply conduit extending inside the respective radial stator arm and supplying said blowers, said blowers being provided along a span of the radial stator arm.

2. The apparatus according to claim 1, wherein the blowers are arranged to differentially distribute a flow of the additional air flow along the span of a radial arm, by providing a greater flow in a part that is close to an external radial end than in a part that is close to an internal radial end.

3. The apparatus according to claim 1, wherein the blowers are arranged to vary a flow of the additional air flow over time according to an operating condition of the propulsion assembly.

4. The apparatus according to claim 1, wherein each radial stator arm of said plurality of radial stator arms comprises two lateral faces extending radially either side of a mean profile, and wherein the blowers comprise orifices arranged on said lateral faces to blow the additional air flow upstream of the trailing edge.

5. The apparatus according to claim 4, wherein two grids placed at an output of said orifices, one sliding relative to another, form an adjuster configured to adjust the additional air flow.

6. The apparatus according to claim 4, wherein each of said orifices has an extension along the longitudinal axis that is between 5% and 10% of a chord length of the respective radial stator arm of said plurality of radial stator arms in relation to a radial distance at which said orifice is located.

7. The apparatus according to claim 1, wherein the plurality of radial stator arms comprises at least a plurality of retention arms configured to retain the nacelle.

8. The apparatus according to claim 1, wherein a distance separating the trailing edge of said radial stator arms and the fan rotor located immediately downstream along said air flow, measured at a radial distance substantially corresponding to 70% of a span of a vane of said fan rotor, is at least substantially equal to three twentieths of an external diameter of said fan rotor.

9. The apparatus according to claim 8, wherein the plurality of radial stator arms comprises at least a plurality of arms comprising a variable-pitch movable part configured to axially deflect said air flow.

10. The apparatus according to claim 9, wherein each radial stator arm of said plurality of radial stator arms comprises two lateral faces extending radially either side of a mean profile, wherein the blowers comprise orifices arranged on said lateral faces to blow the additional air flow upstream of the trailing edge, and wherein the orifices are located upstream of said variable-pitch movable parts.

11. The apparatus according to claim 1, wherein the blowers comprise a plurality of nozzles distributed along the trailing edges.

12. The apparatus according to claim 11, wherein the at least one air supply conduit includes a plurality of air supply conduits, and wherein each nozzle of the plurality of nozzles is supplied by a respective air supply conduit of the plurality of air supply conduits.

13. The apparatus according to claim 11, wherein each nozzle is retractable.

14. The apparatus according to claim 1, wherein the at least one air supply conduit emerge in an internal cavity that communicates with the blower.

15. An apparatus comprising:
a fuselage having a rear and a propulsion assembly, said propulsion assembly comprising a power turbine, at least two distinct gas generators each arranged in a respective primary flow duct, at least one fan rotor placed at the rear of the fuselage, in an extension of the fuselage, along a longitudinal axis, the at least one fan rotor being driven by the power turbine, and a nacelle forming a fairing for said at least one fan rotor through which an air flow circulating along the fuselage passes, wherein each primary flow duct converges towards a central duct that supplies the power turbine:

a plurality of radial stator arms mounted upstream of said at least one fan rotor and extending between the fuselage and the nacelle, each radial stator arm has a substantially trapezoidal shape in an axial plane containing the longitudinal axis, a leading edge of each radial stator arm extending in a direction substantially parallel with the longitudinal axis, wherein the nacelle is annular and comprises an upstream edge, a radially inner surface and a radially outer surface, the leading edge of each radial stator arm having a surface continuity with an outer surface of the fuselage and the radially outer surface of the nacelle, wherein the leading edge of each radial stator arm is linked to said upstream edge and to the fuselage such that each radial stator arm extends upstream of a forward-most portion of the nacelle, each radial stator arm of said plurality of radial stator arms comprising blowers configured to blow, in a vicinity of a trailing edge of said radial stator arms of said plurality of radial stator arms, an additional air flow adding to said air flow entering into the nacelle in an extension of the trailing edge, wherein each radial stator arm of said plurality of radial arms comprises at least an air supply conduit extending inside the radial stator arm and supplying said blowers, said blowers being provided along a span of the radial stator arm, wherein the plurality of radial stator arms comprises at least a plurality of arms comprising a variable-pitch movable part configured to axially deflect said air flow, each radial stator arm of said plurality of radial stator arms comprising two lateral faces extending on radially either side of a mean profile, the blowers comprise orifices arranged on said lateral faces to blow the additional air flow upstream of the trailing edge of the radial stator arm, wherein the orifices are located upstream of said variable-pitch movable part which is configured to deflect the air flow by an angle corresponding substantially to a pitch angle when said variable-pitch movable part rotates.

16. The apparatus according to claim 9, wherein the variable-pitch movable part is arranged on the trailing edge and extends along a radial axis parallel to the trailing edge.

17. The apparatus according to claim 11, wherein each nozzle of said plurality of nozzles having a tubular shape and protruding from a face of the radial stator arm, the plurality of nozzles forming the trailing edge.

18. The apparatus according to claim 4, wherein each orifice of each lateral face is at a same radial height, and wherein the orifices, the air supply conduit and an internal cavity are in a same plane perpendicular to a radial axis forming a canal being T-shaped.

19. The apparatus according to claim 10, wherein each said variable-pitch movable part has a trailing edge forming the trailing edge of the radial stator arm.

20. The apparatus according to claim 14, wherein each orifice of each lateral face is at a same radial height, and wherein the orifices, the air supply conduit and the internal cavity are in a same plane perpendicular to a radial axis forming a canal being T-shaped.

21. An apparatus comprising:
a fuselage having a rear and a propulsion assembly, said propulsion assembly comprising a power turbine, at least two distinct gas generators each arranged in a respective primary flow duct, at least one fan rotor placed at the rear of the fuselage, in an extension of the fuselage, along a longitudinal axis, the at least one fan rotor being driven by the power turbine, and a nacelle forming a fairing for said at least one fan rotor through which an air flow circulating along the fuselage passes, wherein each primary flow duct converges towards a central duct that supplies the power turbine;
a plurality of radial stator arms mounted upstream of said at least one fan rotor and extending between the fuselage and the nacelle, each radial stator arm has a substantially trapezoidal shape in an axial plane containing the longitudinal axis, a leading edge of each radial stator arm extending in a direction substantially parallel with the longitudinal axis,
wherein the nacelle is annular and comprises an upstream edge, a radially inner surface and a radially outer surface, the leading edge of each radial stator arm having a surface continuity with an outer surface of the fuselage and the radially outer surface of the nacelle,
wherein the leading edge of each radial stator arm is linked to said upstream edge and to the fuselage such that each radial stator arm extends upstream of a forward-most portion of the nacelle,
said plurality of radial stator arms each comprising blowers configured to blow, in a vicinity of a trailing edge of said radial stator arms, an additional air flow adding to said air flow entering into the nacelle in an extension of the trailing edge,
wherein each radial stator arm of said plurality of radial stator arms comprises at least one air supply conduit extending inside the radial stator arm and supplying said blowers, said blowers being provided along a span of the radial stator arm,
wherein said each radial stator arm comprises two lateral faces extending radially either side of a mean profile, the blowers comprise orifices arranged on said lateral faces to blow the additional air flow upstream of the trailing edge, the at least one air supply conduit emerges in an internal cavity that communicates with the orifices on each lateral face, said orifices of each lateral face are disposed at a same radial height, wherein the orifices, the air supply conduit and the internal cavity are located in a same plane perpendicular to a radial axis forming a T-shaped canal.

22. The apparatus according to claim 1, wherein the trailing edge of each radial stator arm is substantially transverse to the air flow entering the nacelle and extending substantially along a direction that forms an angle close to a right angle with the fuselage.

23. The apparatus according to claim 15, wherein the trailing edge of each radial stator arm is substantially transverse to the air flow entering the nacelle and extending substantially along a direction that forms an angle close to a right angle with the fuselage.

24. The apparatus according to claim 21, wherein the trailing edge of each radial stator arm is substantially transverse to the air flow entering the nacelle and extending substantially along a direction that forms an angle close to a right angle with the fuselage.

25. The apparatus according to claim 1, wherein the plurality of radial stator arms comprises at least a plurality of radial vanes forming a movable portion.

26. The apparatus according to claim 7, wherein the plurality of radial stator arms comprises at least a plurality of radial vanes forming a movable portion,
wherein said at least some of the plurality of radial vanes are positioned in an azimuth direction between the plurality of retention arms, and
wherein the plurality of retention arms are positioned at a same axial level as the movable portions of the radial stator arms.

* * * * *